(12) United States Patent
Ueno et al.

(10) Patent No.: US 7,890,201 B2
(45) Date of Patent: Feb. 15, 2011

(54) PRODUCTION PLANNING SYSTEM

(75) Inventors: Hidenori Ueno, Yokohama (JP); Hiroyuki Kaneko, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1043 days.

(21) Appl. No.: 11/703,664

(22) Filed: Feb. 8, 2007

(65) Prior Publication Data
US 2007/0208444 A1    Sep. 6, 2007

(30) Foreign Application Priority Data
Feb. 9, 2006   (JP) .............................. 2006-032066

(51) Int. Cl.
*G06F 19/00*   (2006.01)

(52) U.S. Cl. .................. 700/99; 700/100; 700/111; 705/8

(58) Field of Classification Search .......... 700/28, 700/95, 97, 99, 100, 101, 102, 103, 105, 700/106, 107, 111; 705/8, 9, 22, 28
See application file for complete search history.

(56) References Cited

U.S. PATENT DOCUMENTS

| | | | | |
|---|---|---|---|---|
| 5,231,567 | A * | 7/1993 | Matoba et al. .............. 700/100 |
| 6,216,109 | B1 * | 4/2001 | Zweben et al. ................. 705/8 |
| 6,795,742 | B1 * | 9/2004 | Ichikawa ..................... 700/100 |
| 6,885,902 | B2 * | 4/2005 | Crampton et al. ............. 700/99 |
| 6,934,594 | B2 * | 8/2005 | Loring et al. ................ 700/100 |
| 6,947,903 | B1 * | 9/2005 | Perry .......................... 705/28 |
| 7,039,481 | B2 * | 5/2006 | Kawase et al. ................ 700/99 |
| 7,092,775 | B2 * | 8/2006 | Nomoto et al. ............... 700/97 |
| 7,343,212 | B1 * | 3/2008 | Brearley et al. ............... 700/99 |
| 7,624,043 | B2 * | 11/2009 | Sakuma et al. ................. 705/8 |
| 2007/0083413 | A1 * | 4/2007 | Srinivasan et al. ............. 705/8 |

FOREIGN PATENT DOCUMENTS

| | | |
|---|---|---|
| JP | 2000-194755 | 7/2000 |
| JP | 2001-184115 | 7/2001 |

* cited by examiner

*Primary Examiner*—Charles R Kasenge
(74) *Attorney, Agent, or Firm*—Mattingly & Malur, P.C.

(57) ABSTRACT

A production planning system creates executable an production plan for a production workplace while adjusting production capacity giving consideration to a period where production capacity is fixed in each workplace, a period where management of workers between workplaces is possible, and a period where it is not necessary to consider production capacity because of new employment of workers.

8 Claims, 14 Drawing Sheets

SCREEN FOR SETTING MANPOWER CAPACITY LEAD TIME

SET LEAD TIME FOR EACH WORKPLACE.

PERIOD 1 = PERIOD WHERE MANPOWER CAPACITY IS NOT TRANSFERABLE
PERIOD 2 = PERIOD WHERE MANPOWER CAPACITY IS TRANSFERABLE
PERIOD 3 = PERIOD WHERE MANPOWER CAPACITY CAN BE SECURED FREELY

| WORKPLACE | LT (DAYS) TILL PERIOD 2 | LT (DAYS) TILL PERIOD 3 |
|---|---|---|
| A | 7 | 14 |
| B | 7 | 14 |
| C | 7 | 14 |

SET

FIG. 6

PRODUCTION ORDER QUANTITY FILE 70

| PRIORITY SEQUENCE | PRODUCT | DATE | QUANTITY |
|---|---|---|---|
| 1 | P | 2005/08/01 | 10 |
| 2 | Q | 2005/08/01 | 5 |
| 3 | R | 2005/08/01 | 20 |
| 4 | P | 2005/08/02 | 8 |
| 5 | Q | 2005/08/02 | 7 |
| 6 | R | 2005/08/02 | 16 |
| ⋮ | ⋮ | ⋮ | ⋮ |

FIG. 7

MANPOWER CAPACITY FILE 80

| WORKPLACE | DATE | MANPOWER CAPACITY (hr) | FIXED CAPACITY (hr) |
|---|---|---|---|
| A | 2005/08/01 | 500 | 10 |
| B | 2005/08/01 | 600 | 15 |
| C | 2005/08/01 | 400 | 20 |
| A | 2005/08/02 | 500 | 10 |
| B | 2005/08/02 | 600 | 15 |
| C | 2005/08/02 | 400 | 20 |
| ⋮ | ⋮ | ⋮ | ⋮ |
| A | 2005/08/31 | 500 | 10 |
| B | 2005/08/31 | 600 | 15 |
| C | 2005/08/31 | 400 | 20 |

FIG. 8

MANPOWER CAPACITY LEAD TIME FILE 90

| WORKPLACE | LT (DAYS) TILL PERIOD 2 | LT (DAYS) TILL PERIOD 3 |
|---|---|---|
| A | 7 | 14 |
| B | 7 | 14 |
| C | 7 | 14 |

FIG. 9

MANPOWER FILE 100

| PRODUCT | WORKPLACE | MANPOWER GENERATION DATE | | | | | | | |
|---|---|---|---|---|---|---|---|---|---|
| | | 1 | 2 | 3 | 4 | 5 | 6 | 7 | 8 |
| P | A | 20 | | | | | | | |
| Q | B | | 50 | 30 | 50 | | | | 50 |
| R | C | | | 20 | 40 | | 40 | | 40 |

PRODUCTION ORDER QUANTITY FILE 70

| PRIORITY SEQUENCE (71) | PRODUCT (72) | DATE (73) | QUANTITY (74) |
|---|---|---|---|
| 4 | P | 2005/08/02 | 8 |
| 5 | Q | 2005/08/02 | 15 |
| 6 | R | 2005/08/02 | 16 |
| 7 | P | 2005/08/03 | 10 |
| 8 | Q | 2005/08/03 | 5 |
| 9 | R | 2005/08/02 | 5 |
| ⋮ | ⋮ | ⋮ | ⋮ |

IF EXCESS MANPOWER CAPACITY IS FIVE ITEMS, CANCEL FIVE ITEMS AND ADD NEW PRODUCTION ORDER RECORD FOR NEXT DAY

| PRIORITY SEQUENCE (71) | PRODUCT (72) | DATE (73) | QUANTITY (74) |
|---|---|---|---|
| 4 | P | 2005/08/02 | 8 |
| 5 | Q | 2005/08/02 | 10 |
| 6 | R | 2005/08/02 | 16 |
| 7 | Q | 2005/08/03 | 5 |
| 8 | P | 2005/08/03 | 10 |
| 9 | Q | 2005/08/03 | 5 |
| 10 | R | 2005/08/02 | 5 |
| ⋮ | ⋮ | ⋮ | ⋮ |

FIG. 15

| | PRODUCT | DATE | QUANTITY |
|---|---|---|---|
| 114 | P | 2005/08/01 | 5 |
| | Q | 2005/08/01 | 4 |
| | R | 2005/08/01 | 12 |
| | P | 2005/08/02 | 7 |
| | Q | 2005/08/02 | 4 |
| | R | 2005/08/02 | 3 |
| | ... | ... | ... |

Columns: 111, 112, 113

FIG. 16

| | WORKPLACE | DATE | MANPOWER CAPACITY PLANNING (hr) | FIXED CAPACITY (hr) |
|---|---|---|---|---|
| 125 | A | 2005/08/20 | 500 | 10 |
| | B | 2005/08/20 | 600 | 15 |
| | C | 2005/08/20 | 400 | 20 |
| | A | 2005/08/21 | 500 | 10 |
| | B | 2005/08/21 | 600 | 15 |
| | C | 2005/08/21 | 400 | 20 |
| | ... | ... | ... | ... |
| | A | 2005/08/31 | 500 | 10 |
| | B | 2005/08/31 | 600 | 15 |
| | C | 2005/08/31 | 400 | 20 |

Columns: 121, 122, 123, 124

PRODUCTION PLANNING SYSTEM

BACKGROUND OF THE INVENTION

The present invention relates to a technique of making a production plan for a product in response to demand forecast and a production order for the product while considering production capacity on the manufacture side.

Production planning for a product is made in consideration of the production capacity on the manufacture side with respect to a production order presented by the sales side. If the production capacity of processes to be used is insufficient, the production planning is made by increasing the production capacity or adjusting the manufacture load (see Japanese Patent Laid-Open Publication No. 2001-184 (hereinafter referred to as Patent Document 1) and Japanese Patent Laid-Open Publication No. 2000-194755 (hereinafter referred to as Patent Document 2)).

In Patent Document 1, a period where the manufacture load exceeds the equipment capacity is extracted, and the equipment capacity is increased and work leveling of the manufacture load is performed based on a given adjustment rule.

Patent Document 1 describes a method of increasing workers or shortening the operation cycle when the work load exceeds the equipment capacity. The adjustment however is difficult in a case where workers cannot be supplied or transferred from another workplace. In a production mode, such as product assembly, whose bottleneck is manpower capacity, not equipment, training and an education period for new work are needed, so that workers cannot be easily transferred. It is therefore necessary to consider that the manpower capacity at a workplace is fixed in a certain period, after which workers are flexibly accommodated between workplaces. The accommodation of workers between workplaces means that, for example, increasing the capacity of a workplace A by 10 points means reduction of the capacitance of a workplace B by 10 points. In Patent Document 1, since only equipment is targeted, the mutual effect of reducing the capacity of one item of equipment according to an increase in the capacity of another item of equipment is not considered.

With regard to the manpower capacity, in particular, the manpower is procured and optimized in previous production planning, and is not optimized in response to the latest production order. If the manpower capacity is fixedly set in every period, therefore, there occurs an event in which workers are insufficient at one workplace while there are excess workers at another workplace, resulting in the possibility that a production plan is made for lower than the original capacity.

In Patent Document 2, while optimal assignment of persons is ordered for production planning, giving consideration to the state of worker operation-skill acquisition when deciding the worker assignment for cell production or the like, a training period for workers to learn work skills for another workplace is not considered.

SUMMARY OF THE INVENTION

Accordingly, it is an object of the present invention to provide a technique of making production planning giving consideration to transfer of workers between workplaces, new employment of workers, and the like, while adjusting production capacity and production load.

To solve the abovementioned problems, the invention pays attention to the number of producible products achieved by transfer of workers between workplaces.

For example, a production planning system of the invention includes an input unit, a storage unit, a calculation unit and an output unit. The input unit receives production order information including an order including an ordered quantity of production for a product and a production date, manufacture load information representing load for each manufacturing site, which occurs in producing a product, production capacity information per date at a manufacturing site, and lead time information up to a start date for each type of period. The period type includes at least a first period where production capacity cannot be transferred between manufacturing sites and a second period where production capacity can be transferred therebetween. The storage unit stores information inputted by the input unit. The calculation unit, which calculates, for each order, the manufacture load amount for a date at which the manufacture loads occur, using the production order information and the manufacture load information, determines whether or not the accumulated manufacture load exceeds the production capacity at each accumulation point using the production capacity information for each manufacturing site, acquires, in cases in which the accumulated manufacture load exceeds the production capacity, the number of products that cannot be manufactured, equivalent to the manufacture loads that exceed the production capacity, rewrites the production order information by deleting the number of products that cannot be manufactured, from the order in the production order information and adding an order equivalent to the number of products that cannot be manufactured, on or after, or on or before, a designated production date when the load amount belongs to the first period, and rewrites the production capacity information in such a way that production capacity at another manufacture site, which has an excess production capacity, is transferred to a manufacture site which is short of production capacity when the load amount belongs to the second period. The output unit outputs the production order information and the production capacity information rewritten by the calculation unit as a production plan and a production capacity distribution result.

The input unit may further receive part information of a product, inventory information of each part and warehouse schedule information. The calculation unit may further acquire an order date for ordering parts and an ordered quantity thereof from the production order information, may check if the part information exists at the order date from the inventory information and the warehouse schedule information with respect to the order date and the ordered quantity, may calculate the number of products that cannot be manufactured, equivalent to the shortage of parts when the shortage of parts occurs, and may delete the number of products that cannot be manufactured from the order including the number of products that cannot be manufactured and add an order equivalent to the number of products that cannot be manufactured on or after a designated production order date.

The input unit may include means which receives designation of the lead time information.

The calculation unit may acquire the start date of the period type by adding a lead time to a date on which, or a time at which, calculation is performed.

The calculation unit may determine the day of the week from a date on which calculation is performed, and correct lead time of the period type by adding or subtracting the number of days set for each day of the week.

According to the invention, the production capacity is checked, giving consideration to the period type, such as the period in which workers are confirmed at each workplace, the period in which workers are transferable between workplaces, and the period in which new employment of workers is possible so that the production capacity can be considered free. This makes it possible to make an executable production plan, giving consideration to transfer of workers between workplaces carried out at a manufacture site.

The period type can be automatically updated according to the timing at which production planning is made by holding the lead time until switching of the period type to another period type with respect to the point in time (day, time) at which calculation is performed, so that the manufacture department does not need to change the setting of the period type to be synchronous with the frequency of the production planning.

At the time of determining the period type, the day of the week at which calculation is to be performed is determined, the lead time until switching of the period type to another period type is changed to a new lead time by adding or subtracting the number of days. In particular, the invention copes with a production management mode in which work contents are fixed for each period which comprises a week or several days, and the period type is not automatically updated everyday, but is updated every period in a looping manner.

BRIEF DESCRIPTION OF THE DRAWINGS

FIG. 3 is a diagram showing a display screen for setting manpower capacity lead time;

FIG. 6 is a diagram showing a structural example of a production order file;

FIG. 7 is a diagram showing a structural example of a manpower capacity file;

FIG. 8 is a diagram showing a structural example of the manpower capacity lead time;

FIG. 9 is a diagram showing a structural example of a manpower file;

FIG. 15 is part 1 of a diagram showing a structural example of output data;

FIG. 16 is part 2 of the diagram showing the structural example of output data;

DETAILED DESCRIPTION OF THE PREFERRED EMBODIMENT

One embodiment of the present invention will be described below referring to the accompanying drawings. Illustrated values are given to facilitate understanding of the invention, and are not necessarily consistent.

While production capacities include manpower capacity and equipment capacity, only the manpower capacity is referred to in the following description of the embodiment. It is however possible to read the same input file and perform calculation to output production planning for the equipment capacity.

The description of the embodiment is given on the premise that there are three periods, period 1, period 2 and period 3, and there are three workplaces, workplace A, workplace B and workplace C.

Figure 2:
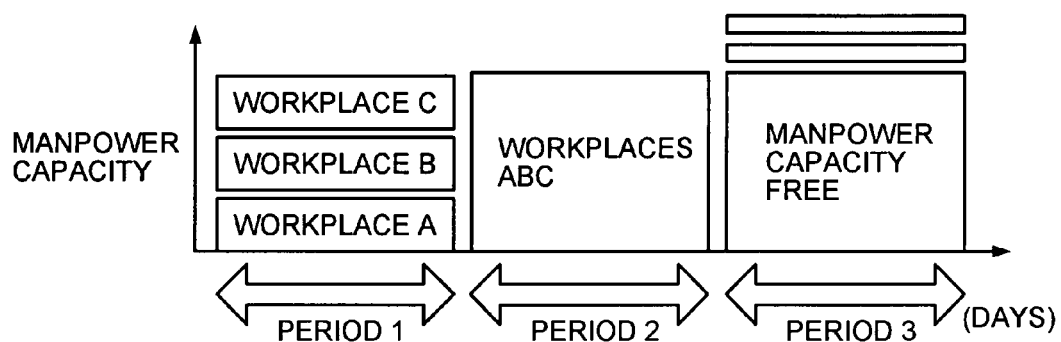
FIG. 2 is a diagram showing an example of a period type.

FIG. 2 shows the features of individual period types.

The period 1 is a period in which the manpower capacity of each workplace is fixed. When it is checked if the manpower capacity is sufficient for a production order (called "manpower capacity check"), the check is carried out for each workplace.

The period 2 is a period in which the manpower capacity is transferable between workplaces. That is, workers can be transferred from workplace A to workplace B.

The period 3 is a period in which workers can be newly added. In this example, as many workers as needed can be added, and the manpower capacity is infinite. That is, the manpower capacity check is not performed in the period 3.

Figure 1:
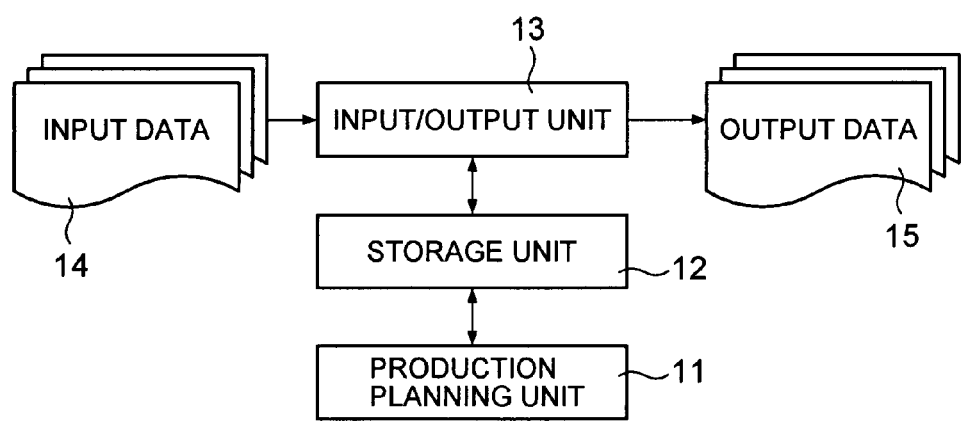
FIG. 1 is a functional structural diagram of a production planning system.

FIG. 1 is a functional structural diagram of a production planning system.

The production planning system includes a production planning unit 11, a storage unit 12, and an input/output unit 13, and outputs output data 15 with respect to input data 14.

The production planning system can be realized by a general-purpose computer including a CPU(Central Processing Unit), a memory, an HDD(Hard Disk Drive), and so forth. The aforementioned functional sections can be achieved by the CPU running a program.

The production planning unit 11 calculates production planning and allocation of the manpower capacity to each workplace based on the input data 14.

The storage unit 12 stores the input data 14, and the output data 15 or information output from the production planning unit 11 whose calculation is in progress.

The input/output unit 13 includes an input unit and an output unit. The input unit is an apparatus which receives input from an operator. For example, the input unit corresponds to a keyboard, a mouse, a CD-ROM device, a floppy (registered trademark) disk drive unit, a USB port or the like, as well as an apparatus which acquires information through a network line in cases of acquiring the input data 14 over a network. The output unit corresponds to, for example, a display apparatus, a CD-ROM apparatus, a floppy disk drive unit, a USB port as well as an apparatus which, like the input unit, acquires information through a network line in cases of outputting the output data 15 over a network.

The input data 14 includes a production order quantity file 70, a manpower capacity file 80, a manpower capacity lead time file 90, and a manpower file 100.

The production order quantity file 70, as shown in FIG. 6, includes a plurality of orders 75. Each order 75 includes information on priority sequence 71, a product 72 for production, a production order date (finishing date) 73 and production ordered quantity 74.

As shown in FIG. 7, the manpower capacity file 80 includes information on the period type for each date at each workplace. Specifically, the manpower capacity file 80 includes a workplace 81, a date 82, a manpower capacity 83, and a fixed capacity 84 for each record 85. The fixed capacity 84 is an untransferable capacity. When the manpower capacity 83 is "500" and the fixed capacity 84 is "10", for example, the capacity of "490" is transferable to another workplace.

As shown in FIG. 8, the manpower capacity lead time file 90 includes information on the lead time (the number of days for switching the method of checking the manpower capacity) till the period type for each workplace. Specifically, the manpower capacity lead time file 90 includes a workplace 91, a lead time 92 till the period 2, and a lead time 93 till the period 3, for each record 94.

The lead time can be changed by the operator.

FIG. 3 shows one example of a lead-time setting screen 130. The production planning unit 11 receives input lead times up to the period 2 and the period 3 for each workplace via the input unit from the operator through such a display screen. The production planning unit 11 stores, in the manpower capacity lead time file 90, and updates the received lead times.

As shown in FIG. 9, the manpower file 100 includes information on the manpower that is generated for each finished product according to a date at each workplace. Specifically, the manpower file 100 includes timing 103 at which the manpower is generated (indicating how many days (or how many hours) before the manpower is generated), and necessary manpower 104 per finished product at the timing 103. The example of FIG. 9 shows the manpower that is generated on each day for a finished product whose lead time is 8 days.

Description of Operation

The operation of the production planning system with the above-described configuration will be explained below.

Figure 4:
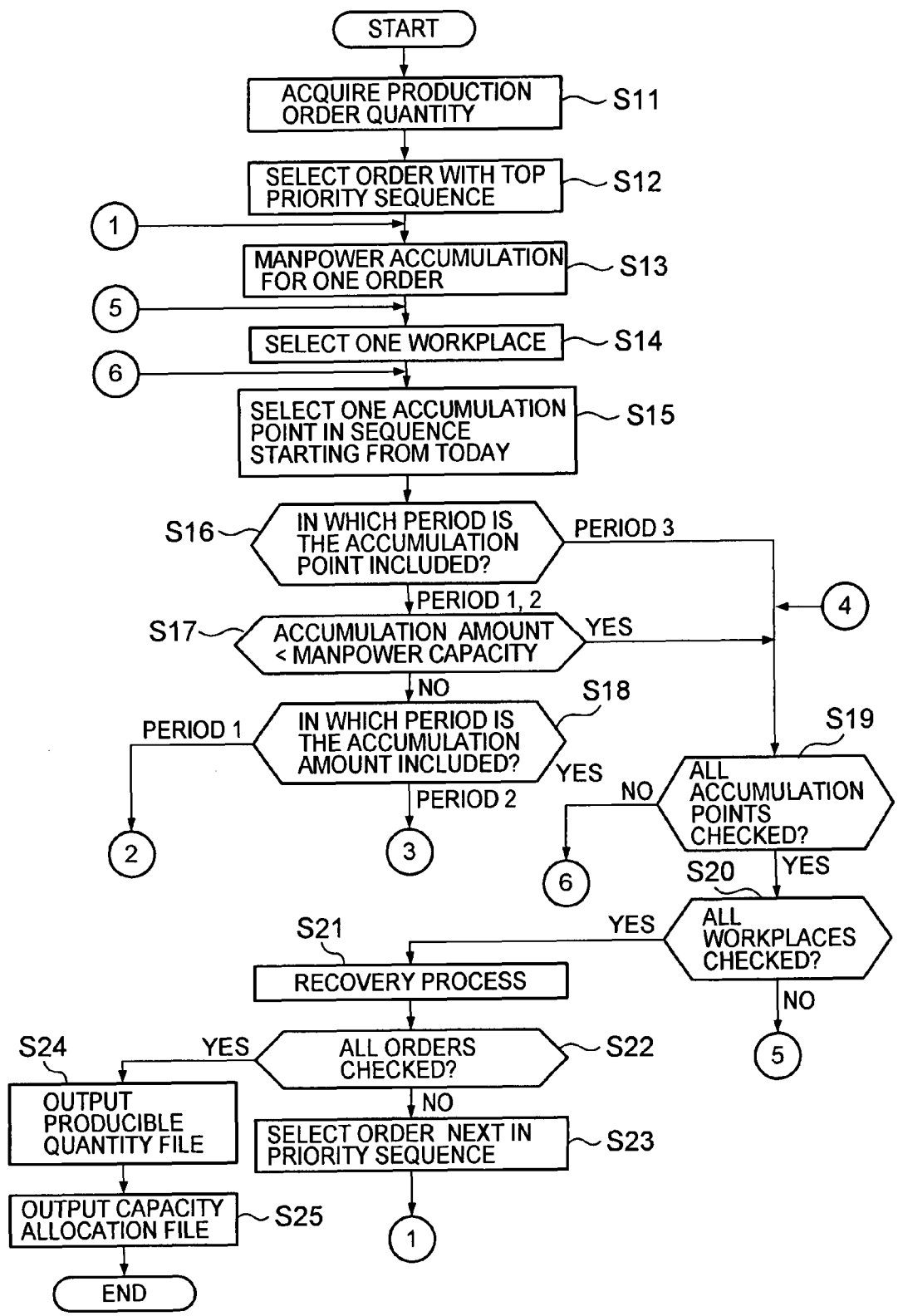
FIG. 4 is a flowchart showing part 1 of a production planning process.

FIG. 4 is a flowchart illustrating the flow of a production planning process.

This flow is initiated when the operator requests a production plan based on the input data 14.

The production planning unit 11 reads the production order quantity file 70 (S11), and acquires an order 75 that is first in the priority sequence 71 (S12).

Figure 10:
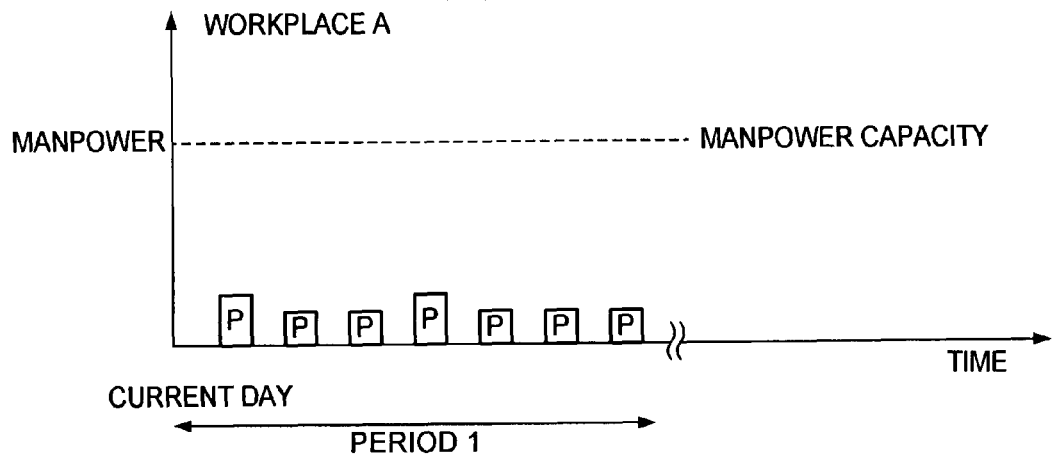
FIG. 10 is part 1 of a diagram illustrating how accumulation is carried out.
Figure 10:
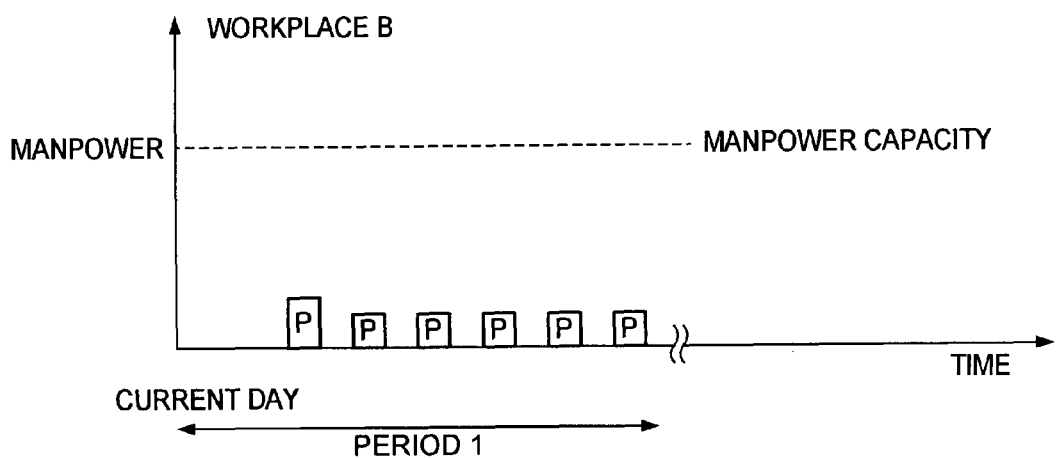
Figure 10:
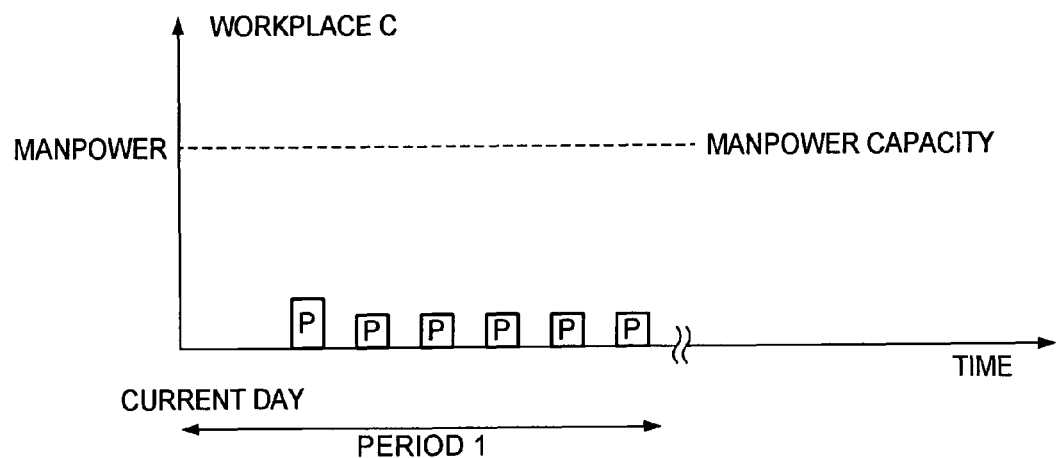

Next, the production planning unit 11 accumulate the manpower for one order (S13). When the produced product in the acquired order is "P", for example, information on the finished product "P" is acquired from the manpower file 100. Then, the production planning unit 11 acquires the manpower generation timing 103 and the generated manpower 104 for the finished product "P" at each workplace, and multiplies the generated manpower 104 by the production ordered quantity 74 included in the order to add up the manpower for each point. FIG. 10 is a diagram illustrating how accumulation is carried out with the horizontal axis representing the time (point in time of accumulation) while the vertical axis represents the manpower.

Next, the production planning unit 11 selects one workplace (S14 in FIG. 4). The production planning unit 11 selects one accumulation point in sequence, starting from the current day (S15). Further, the production planning unit 11 determines in which one of the periods 1, 2 and 3 the selected accumulation point is included (S16). Specifically, the production planning unit 11 extracts the lead times 92, 93 for the periods 2, 3 at the workplace selected in S14 from the manpower capacity lead time file 90, acquires the start date of each period by adding each lead time to the present date, and determines in which period the accumulation point is included.

When the accumulation point selected in S15 is included in the period 1 or the period 2, the production planning unit 11 determines whether or not the accumulated amount (manpower) is less than the manpower capacity at that time (S17). The production planning unit 11 extracts the manpower capacity 83 at the date 82 corresponding to the accumulation point selected in S15 at the workplace 81 corresponding to the workplace selected in S14, from the manpower capacity file 80 and uses the manpower capacity 83 in making the decision.

When the accumulated amount is equal to or greater than the manpower capacity (No in S17), the production planning unit 11 determines again in which period the accumulation point is included (S18).

Figure 11:
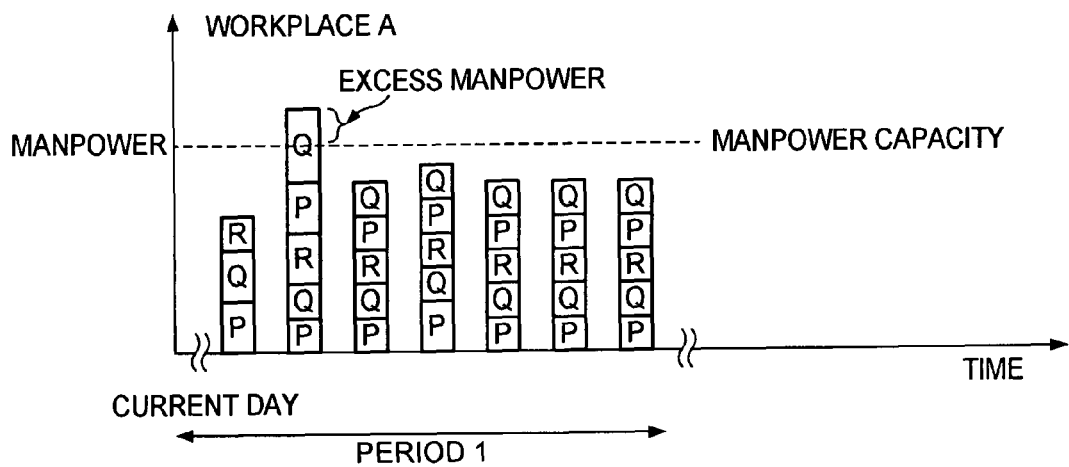
FIG. 11 is part 2 of the diagram illustrating how accumulation is carried out.
Figure 11:
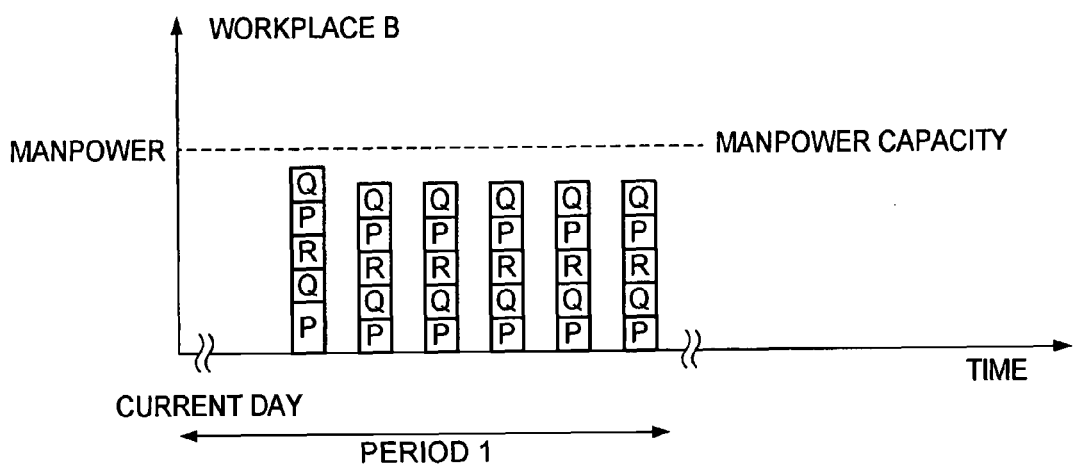
Figure 11:
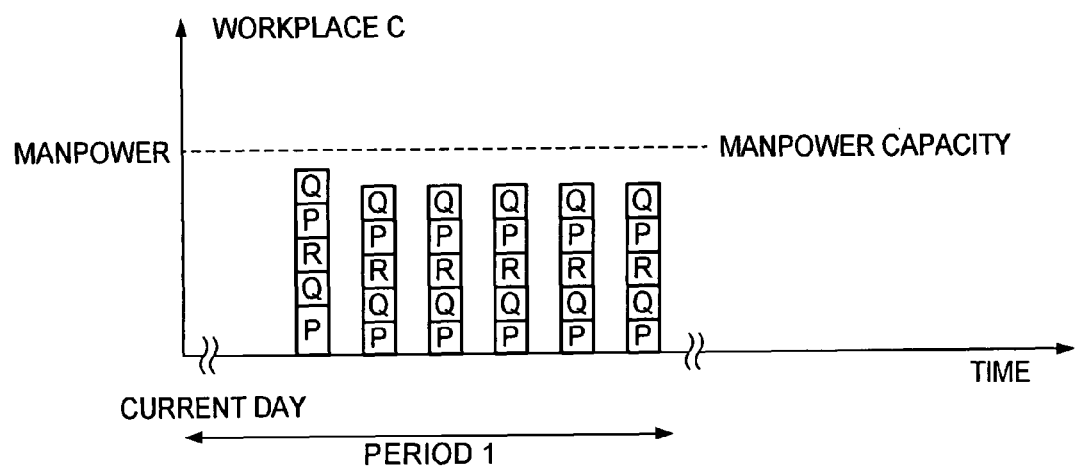

FIG. 11 is a diagram illustrating a case where the accumulated amount in the workplace A exceeds the manpower capacity and the accumulation point is included in the period 1.

Figure 5:
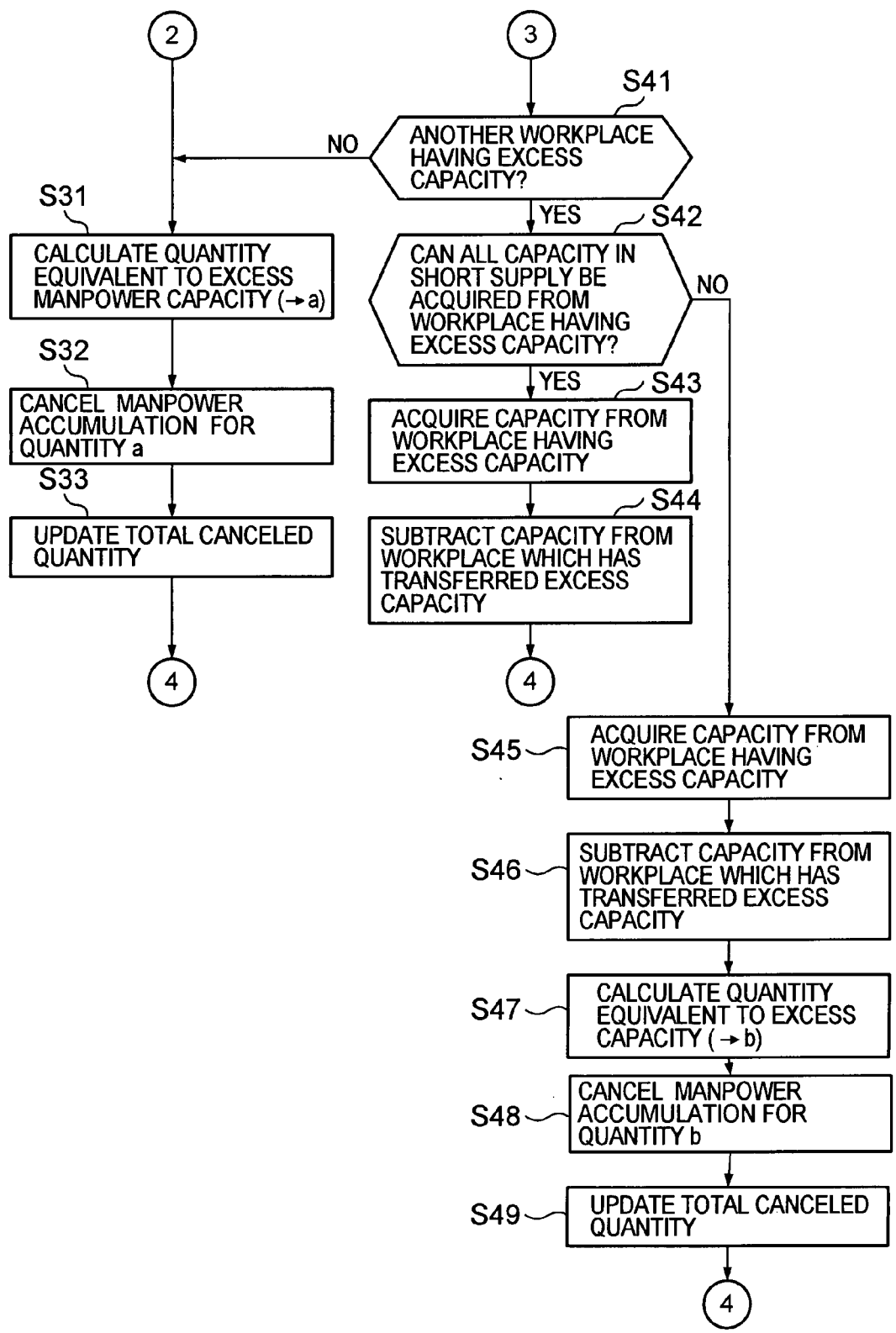
FIG. 5 is a flowchart showing part 2 of the production planning process.

Referring to FIG. 5 which is a continuation of the flowchart of FIG. 4, a description will be given of a case where the accumulated amount exceeds the manpower capacity and the accumulation point is included in the period 1.

The production planning unit 11 calculates a quantity 'a' equivalent to the excess manpower capacity (S31). Specifically, first, the production planning unit 11 subtracts the manpower capacity from the accumulated amount to acquire the excess manpower capacity. Referring to the manpower file 100, the production planning unit 11 acquires the necessary manpower 104 of the manpower generation timing 103 equivalent to the accumulation point to acquire the manpower occurred for one product. The production planning unit 11 divides the manpower for the excess manpower capacity by the manpower generated for one product to acquire the excess quantity 'a'.

Next, the production planning unit 11 subtracts the excess quantity 'a' from the production ordered quantity 74 included in the order to cancel the quantity 'a'. Then, based on the order reflecting the cancellation, the production planning unit 11 performs accumulation of the manpower for every accumulation point at every workplace again in the same way as explained above (S32).

Figure 12:
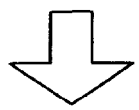
FIG. 12 is a diagram illustrating how a production order file is rewritten.

FIG. 12 is a diagram illustrating the excess quantity 'a' subtracted from the production ordered quantity 74 in the order (see order with the priority sequence of "5").

Returning to FIG. 5, the production planning unit 11 then updates the total canceled quantity (S33), and proceeds to the process of S19 in FIG. 4.

A description will now be given of a case where it is determined in S18 in FIG. 4 that the accumulation point is included in the period 2.

Figure 13:
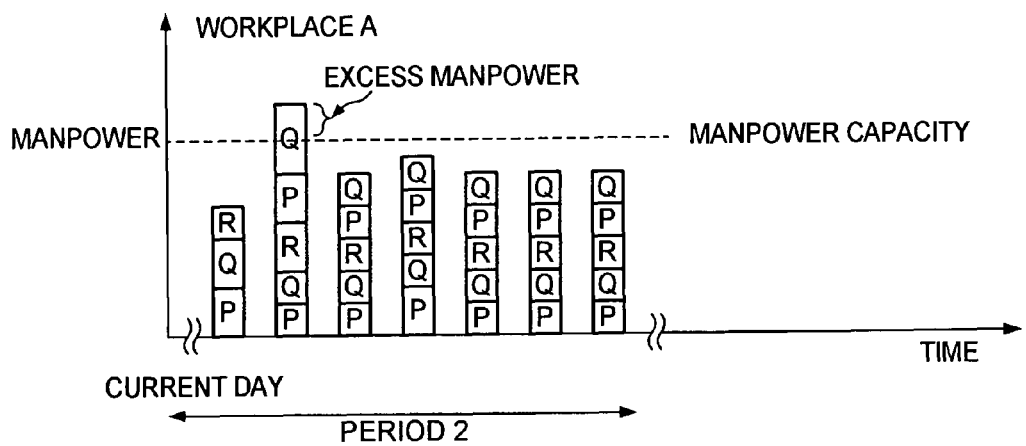
FIG. 13 is part 3 of the diagram illustrating how accumulation is carried out.
Figure 13:
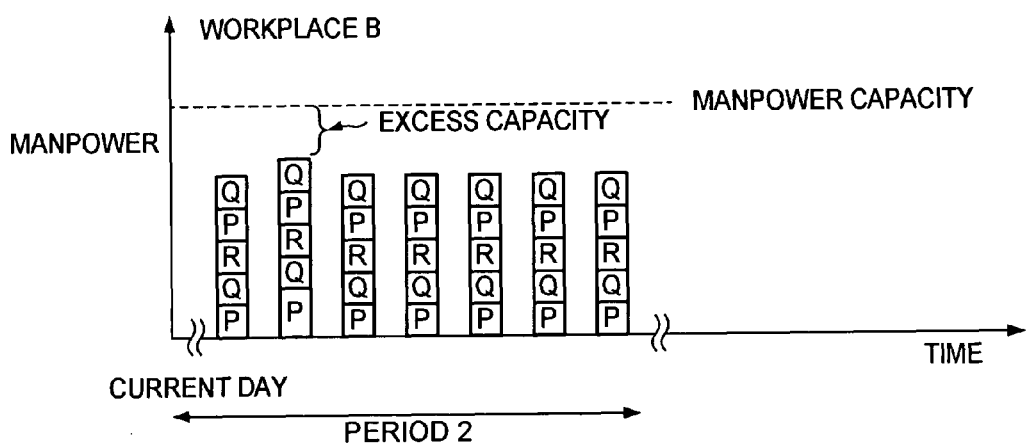
Figure 13:
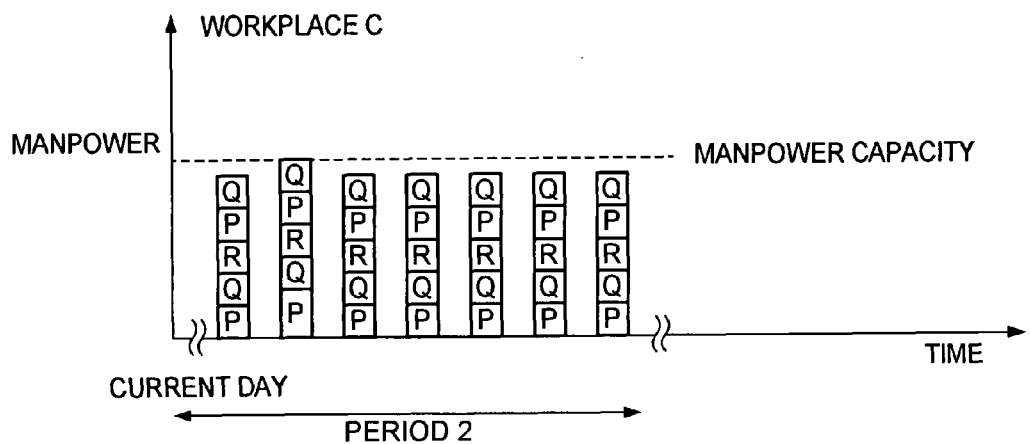

FIG. 13 is part 3 of the diagram illustrating how accumulation is carried out when the accumulated amount exceeds the manpower capacity and the accumulation point is included in the period 2.

A description is given with reference to FIG. 5. The production planning unit 11 determines whether another workplace has excess capacity or not (S41). Specifically, as shown in FIG. 13, there may be a case where at the same accumulation point, the accumulation point exceeds the manpower capacity at the workplace A, but not at the workplace B. Accordingly, the production planning unit 11 extracts from the manpower capacity file 80 the manpower capacity 83 at each workplace 81 at the date 82 corresponding to the accumulation point at which the accumulation point exceeds the manpower capacity, and compares the manpower capacity 83 with the accumulated amount at the accumulation point at each workplace, to determine if there is excess capacity.

When another workplace does not have excess capacity (S41: No), the production planning unit 11 goes to step S31.

When another workplace has excess capacity (S41: Yes), on the other hand, the production planning unit 11 determines whether or not all the insufficient capacity can be acquired from the workplace which has the excess capacity (the workplace B in the example of FIG. 13) (S42). Specifically, the production planning unit 11 determines whether the total excess capacity at another workplace is greater than the excess manpower or not.

When all the insufficient capacity can be acquired from another workplace (S42: Yes), the production planning unit 11 acquires the manpower from the workplace which has the excess capacity (S43). Further, the production planning unit 11 subtracts the excess capacity from the manpower capacity at the workplace which has given the excess capacity accordingly (S44).

Figure 14:
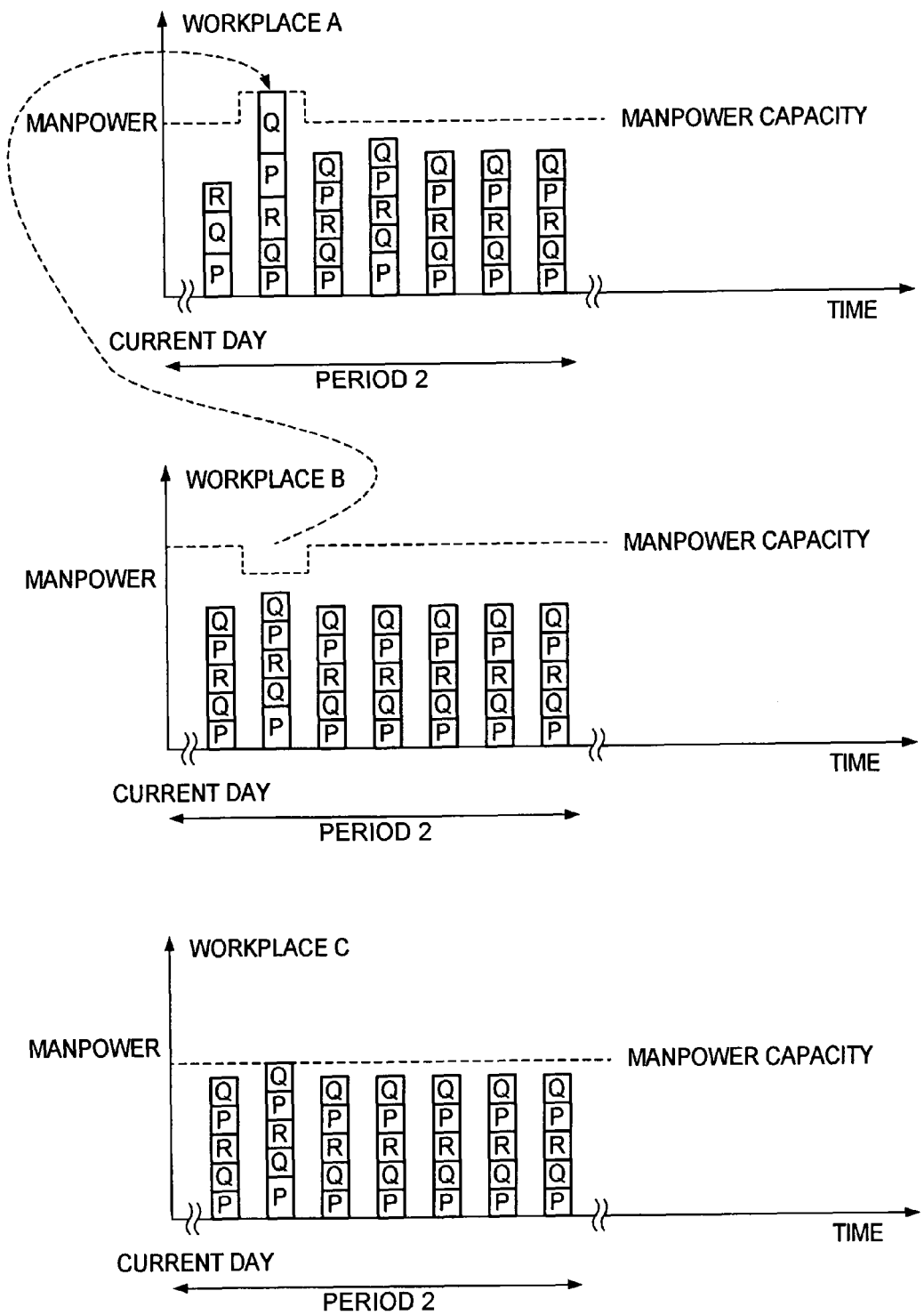
FIG. 14 is part 4 of the diagram illustrating how accumulation is carried out.

FIG. 14 is a diagram illustrating how the workplace A acquires the excess capacity from another workplace B to increase its manpower capacity so that the excess manpower is gone. The manpower capacity at the workplace B is reduced. To perform the process, the production planning unit 11 rewrites the manpower capacity 83 at the date 82 equivalent to the current accumulation point. That is, the production planning unit 11 subtracts the manpower capacity to be transferred, from the manpower capacity 83 at the workplace having the excess capacity, and increases the manpower capacity 83 at the workplace whose manpower capacity is insufficient to update the manpower capacity. Thereafter, the production planning unit 11 proceeds to the process of S19 to be described later.

When it is determined in S42 of FIG. 5 that it is not possible to acquire all the insufficient manpower capacity from the workplace which has the excess capacity (S42: No), the production planning unit 11 acquires possible manpower from the workplace which has the excess capacity (S45). Further, the production planning unit 11 subtracts the excess capacity from the manpower capacity at the workplace which has transferred the excess capacity accordingly (S46). The production planning unit 11 calculates a quantity b equivalent to manpower that is still insufficient (excess capacity) (S47), and performs a process of canceling the quantity b from the order (S48). The way of obtaining the quantity b equivalent to the excess manpower and the way of canceling the quantity b are the same as explained in the above-described processes (S31, S32). Thereafter, the production planning unit 11 updates the total canceling quantity (S49), and proceeds to the process of S19 that is described later.

The processes at and following S19 of FIG. 4 will be described below.

The production planning unit 11 checks if there is an unselected accumulation point (S19), and returns to S15 to continue the processing (S19) if there is an unselected accumulation point.

When there is no unselected accumulation point (S19: Yes), the production planning unit 11 checks if there is an unselected workplace (S20). When there is an unselected workplace, the production planning unit 11 returns to S14 to continue the processing.

When there is no unselected workplace (S20: Yes), the production planning unit 11 performs a process of recovering the canceled quantity (S21). Specifically, the production planning unit 11 adds an order for producing the total quantity canceled so far to the production order quantity file 70. At this time, the production planning unit 11 adds the order in such a way that the order is placed on the day following the date 73 of the production order date of the currently selected order. Further, the production planning unit 11 sets the priority sequence 71 of the order to be added to the next in the priority sequence of all the orders that have the same production order date as that of the currently selected order. Accordingly, the priority sequence 71 of an order whose priority sequence is equal to or after the set priority sequence is rewritten. An order may be added to an order on or before the same production order date as that of the currently selected order. In this case, however, the flow of FIG. 4 is carried out again from the start.

FIG. 12 shows how an order is added to recover the canceled quantity for a finished product "Q". An order with the priority sequence of "7" is added for recovery.

Returning to FIG. 4, the production planning unit 11 then checks if there is an unselected order (S22), and returns to S13 to continue the processing when there is an unselected order (No in S22).

When there is no unselected order (S22: Yes), the production planning unit 11 outputs the production order quantity file 70 rewritten in the processes so far as a producible quantity file 110 (S24).

FIG. 15 shows a structural example of the producible quantity file 110 to be output. The producible quantity file 110 includes a product 111 to be manufactured, a production completion date (equivalent to the date of the production order) 112, and a production quantity 113 for each record 114.

Further, the production planning unit 11 outputs the manpower capacity file 80 rewritten in the processes so far, as a capacity allocation file 120 (S25).

FIG. 16 shows a structural example of the capacity allocation file 120 to be outputted. The capacity allocation file 120 includes a workplace 121, a date 122, a manpower capacity (manpower capacity planning) 123, and a fixed capacity 124 for each record 125.

After outputting the producible quantity file (production planning) 110 and the capacity allocation file (capacity allocation result) 120, the production planning unit 11 terminates the production planning process.

One embodiment of the invention has been explained above.

According to the embodiment, production planning can be adjusted in consideration of transfer of workers (manpower capacity) between workplaces. Further, production planning can be adjusted in consideration of transfer of the period where workers cannot be transferred, the period where workers can be transferred, the period where workers can be secured freely, and the lead times for the periods.

The embodiment can be modified as follows.

Figure 17:
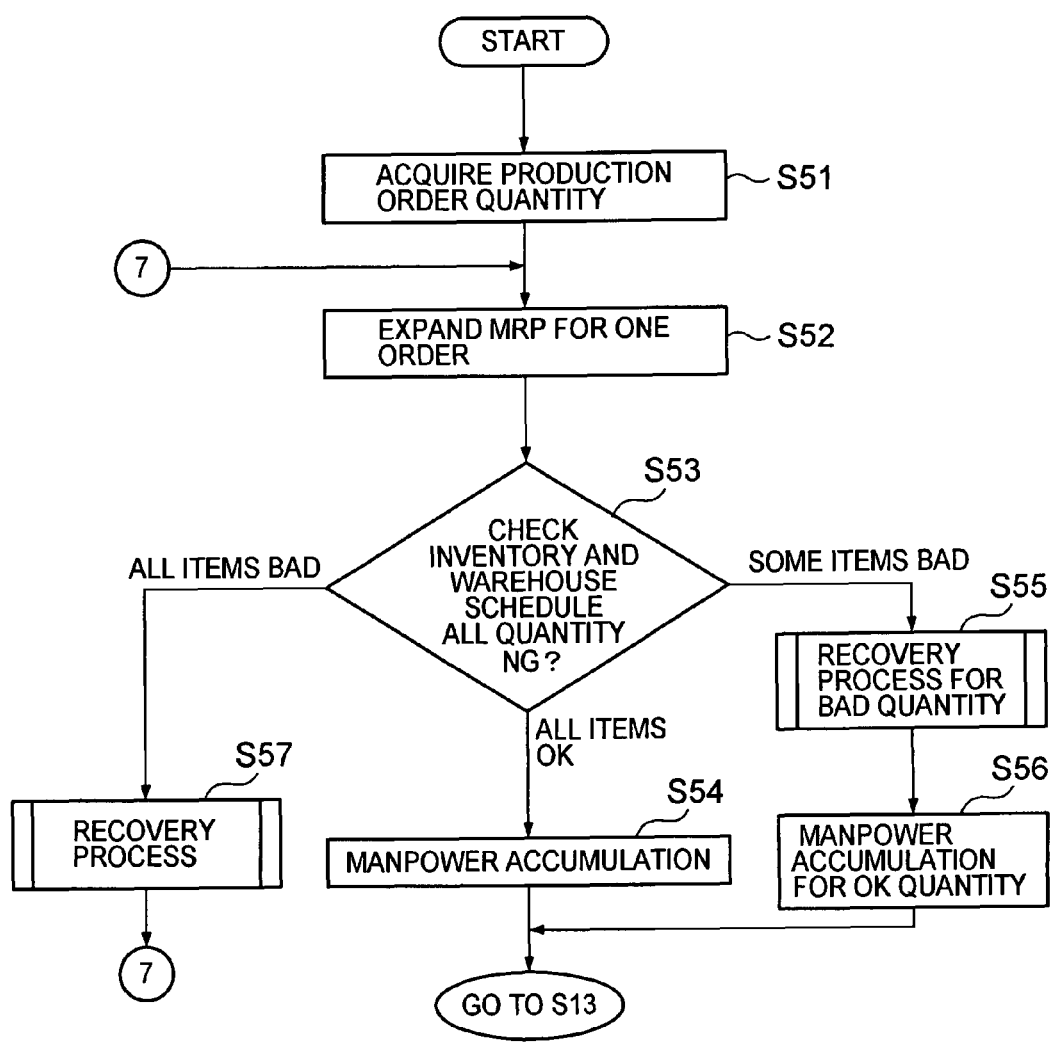
FIG. 17 is a flowchart of a process when production planning is made by checking both materials restrictions and manpower capacity.

FIG. 17 shows the process procedures when a process of checking if materials (parts) are sufficient (called "material check") and the manpower capacity check are executed at the same time. While the producible quantity is checked by performing MRP (Material Requirements Planning) with respect to the production ordered quantity in the illustrated example, the material check may be executed by another method.

First, the production planning unit 11 acquires the production order quantity file 70 (S51).

Next, the production planning unit 11 selects one order according to the priority sequence, and expands MRP using an available method to acquire necessary materials and the timing at which the materials are needed (S52).

Then, the production planning unit 11 checks if necessary materials are secured at the timing at which the materials are needed. Inventory information of materials and information on the warehouse schedule thereof are stored in advance in the storage unit 12. The production planning unit 11 acquires a securable amount of each material for each date beforehand using the inventory information and the warehouse schedule, and stores information on the securable amount in the storage unit 12 beforehand.

If all the parts that are needed by the selected order cannot be secured, i.e., if all the quantity cannot be produced (S53: "All ITEMS BAD"), the production planning unit 11 sets the quantity as a new order, on the next day, as done in the recovery process (S57), and then returns to S52.

When all parts that are needed by the selected order can be secured (S53: "All ITEMS OK"), the production planning unit 11 performs accumulation of the manpower for one order (S54), and performs processes after S13 of FIG. 4.

When some of the parts needed by the selected order are in short supply, the production planning unit 11 sets the production shortfall quantity as a new order the next day. This process is the same as the recovery process (S55). Thereafter, the production planning unit 11 performs accumulation of the manpower with respect to the quantity for which materials are sufficient (S56). Then, the production planning unit 11 proceeds to the process after S13 of FIG. 4.

In this manner, the material check and the manpower capacity check can be executed simultaneously.

With respect to the period lead time, the production planning unit 11 may perform the following process.

Figure 18A:
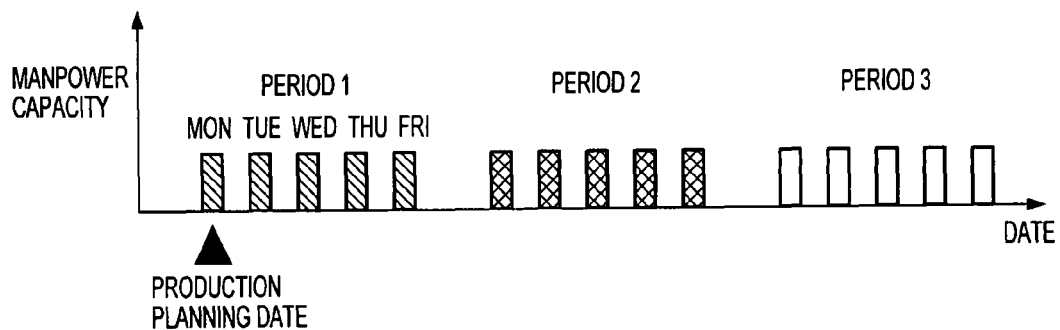
FIGS. 18A to 18C are diagrams illustrating the relationship between a calculation date and a period type.
Figure 18B:
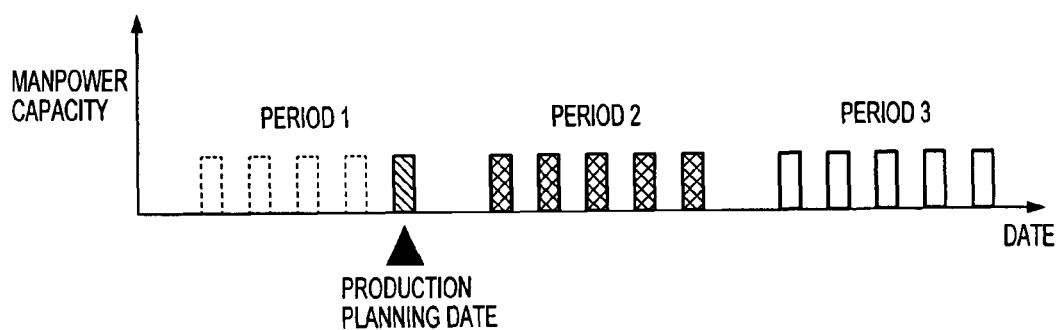
Figure 18C:
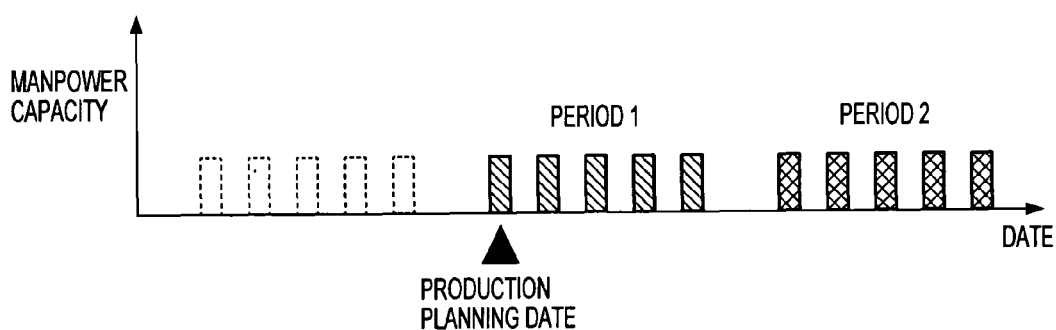

The start dates of the period 2 and the period 3 are set in the manpower capacity lead time file 90, and depend on the calculation date of the present system. That is, according to the embodiment, the production planning unit 11 acquires the start date of each period by adding the lead time to the date on which or the time at which calculation is to be performed. When switching to each period occurs once a week as shown in FIGS. 18A to 18C, however, the lead time to switching to the period 2 or the period 3 needs to be corrected. In this respect, the day of the week for the calculation is determined, and the manpower capacity lead time is corrected based thereon.

For example, the production planning unit 11 sets the period 1 to the previous one week, the period 2 to the second week and the period 3 to the third week or subsequent weeks.

If the calculation point is September 1 (Monday), with the lead time to switching to the period 2 being 7 days (calendar date base), and the lead time to switching to the period 3 being 14 days (calendar date base), the period 2 starts on September 8, the seventh day from September 1. If the start of the period 2 is set to September 8 also for the next day September 2 (Tuesday), the lead time is corrected by subtracting one day from 7 days, to obtain September 8, the sixth day from September 2.

In summary, the following correction is carried out according to the calculated day of the week.

| | |
|---|---|
| For Monday | (lead time till period 2) = 7 − 0 = 7 days |
| For Tuesday | (lead time till period 2) = 7 − 1 = 6 days |
| For Wednesday | (lead time till period 2) = 7 − 2 = 5 days |
| For Thursday | (lead time till period 2) = 7 − 3 = 4 days |
| For Friday | (lead time till period 2) = 7 − 4 = 3 days |
| For Saturday | (lead time till period 2) = 7 − 5 = 2 days |
| For Sunday | (lead time till period 2) = 7 − 6 = 1 day |

Although the lead time is corrected above by subtraction, the correction may also be carried out by addition.

The sequence of the individual steps shown in FIGS. 4, 5 and 17 can be changed within the scope of the present invention.

What is claimed is:

1. A production planning system comprising:
an input unit which receives production order information including an order including an ordered quantity of production of a finished product and a production date, manufacture load information representing a load for each manufacturing site, which is generated to produce a finished product, production capacity information for each date at a manufacturing site, and information on lead time up to a start date of a period type, which includes at least a first period where production capacity cannot be transferred between manufacture sites and a second period where production capacity can be transferred therebetween;
a storage unit which stores information inputted by the input unit;
a calculation unit which calculates, for each order, accumulation of manufacture load for a date at which the manufacture load occurs using the production order information and the manufacture load information, determines whether or not the accumulated manufacture load exceeds the production capacity at each accumulation point using the production capacity information for each manufacture site, acquires a number of products that cannot be manufactured equivalent to the manufacture load that exceed the production capacity when the accumulated manufacture load exceeds the production capacity, rewrites the production order information by deleting the number of products that cannot be manufactured from the order in the production order information and adding an order equivalent to the number of products that cannot be manufactured on or after, or on or before, a designated production date, when the accumulation point belongs to the first period, and rewrites the production capacity information in such a way that production capacity at another manufacture site, which has excess production capacity, is transferred to a manufacture site which has insufficient production capacity, when the accumulation point belongs to the second period; and
an output unit which outputs the production order information and the production capacity information rewritten by the calculation unit, as a production plan and a production capacity distribution result.

2. The production planning system according to claim 1, wherein the input unit further receives material information for materials, inventory information of each material and warehouse schedule information, and
the calculation unit further acquires an order date of materials and an ordered quantity thereof from the production order information, checks if the material information exists for the order date, from the inventory information and the warehouse schedule information with respect to the order date and the ordered quantity, calculates the number of products that cannot be manufactured, equivalent to shortage of parts when a shortage of parts occurs, and deletes the number of products that cannot be manufactured from the order that includes the number of products that cannot be manufactured, and adds an order equivalent to the number of products that cannot be manufactured, on or after a designated production order date.

3. The production planning system according to claim 1, wherein the input unit includes means which receives designation of the lead time information.

4. The production planning system according to claim 2, wherein the input unit includes means which receives designation of the lead time information.

5. The production planning system according to claim 1, wherein the calculation unit acquires the start date of the period type by adding a lead time to a date on which, or a time at which, calculation is performed.

6. The production planning system according to claim 2, wherein the calculation unit acquires the start date of the period type by adding a lead time to a date on which, or a time at which, calculation is performed.

7. The production planning system according to claim 1, wherein the calculation unit determines a day of a week from a date on which calculation is performed, and corrects a lead time of the period type by adding or subtracting a number of days set for each day of the week.

8. The production planning system according to claim 2, wherein the calculation unit determines a day of a week from a date on which calculation is performed, and corrects a lead time of the period type by adding or subtracting a number of days set for each day of a week.

* * * * *